No. 620,316. Patented Feb. 28, 1899.
J. R. HASELDEN.
FILTER.
(Application filed Mar. 31, 1898.)
(No Model.)

Witnesses
J. C. Shaw
Chas. E. Brock

Inventor
J. R. Haselden,
by O'Maro Lee
Attorneys

THE NORRIS PETERS CO., PHOTO-LITHO., WASHINGTON, D. C.

UNITED STATES PATENT OFFICE.

JOHN RAYMOND HASELDEN, OF LANCASTER, KENTUCKY.

FILTER.

SPECIFICATION forming part of Letters Patent No. 620,316, dated February 28, 1899.

Application filed March 31, 1898. Serial No. 675,916. (No model.)

*To all whom it may concern:*

Be it known that I, JOHN RAYMOND HASELDEN, a citizen of the United States, residing at Lancaster, in the county of Garrard and State of Kentucky, have invented a new and useful Filter, of which the following is a specification.

My invention relates to filters, and more especially to a class of filters adapted for filtering the water discharged from a rain-spout.

The object of the invention is to generally simplify, cheapen, and improve the construction of such filters, while rendering them more efficient in operation and more readily cleaned.

With this object in view my invention consists in a filter comprising a main body with closed bottom, a discharge-pipe near the bottom, a sieve-diaphragm, also near the bottom, a removable sieve-diaphragm near the top, a section of rain-spout projecting through the top, and upon which the lid is pivoted, into and through the two diaphragms and an intermediate body of filtering material, discharging into a compartment below the lower diaphragm, and a second tube with a flared mouth, depending from the upper diaphragm and projecting downward through the filtering material, the lower diaphragm, and the bottom of the filter, whereby the water from the rain-spout is dropped directly into the lower compartment, forced by the pressure of the water in the spout upward through the two diaphragms and the intermediate filtering material into the upper compartment of the filter, from which it is discharged through a sponge into and through a discharge-pipe.

In order to enable others skilled in the art to which my invention most nearly appertains to make and use the same, I will now proceed to describe its construction and operation, reference being had to the accompanying drawings, forming part of this specification, in which—

Figure 1:
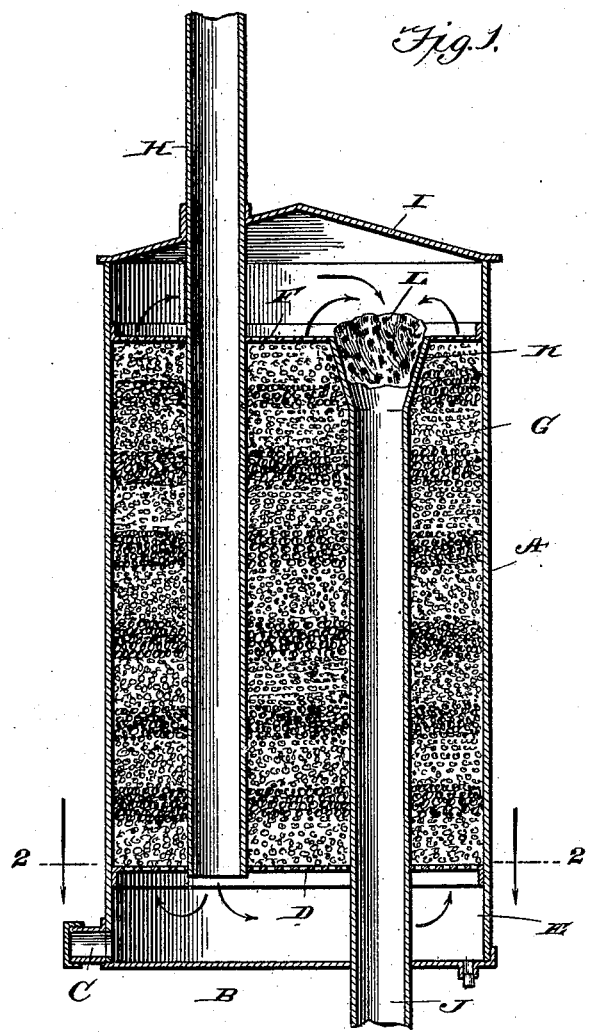
Figure 2:
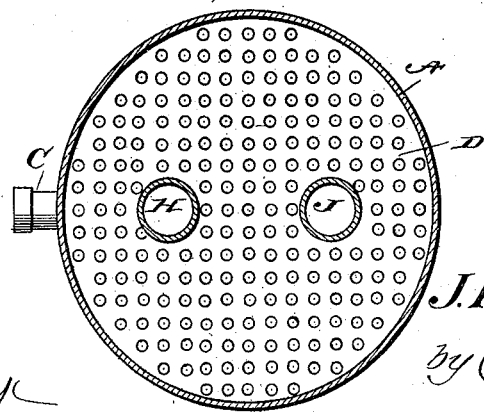

Figure 1 is a vertical sectional view illustrating a filter constructed in accordance with my invention. Fig. 2 is a transverse section through the same on the broken line 2 2 of Fig. 1, looking downward.

Like letters of reference mark the same parts wherever they occur in both figures of the drawings.

Referring to the drawings by letters, A indicates the main body of the filter, which is preferably cylindrical in form and which may be made of tin or other suitable material.

The bottom B is closed and a discharge-spout C provided at one side, near the bottom, for emptying the filter when desired.

D indicates a perforated diaphragm secured in the body of the filter, near its lower end, leaving a compartment E below it.

F indicates a removable perforated or sieve diaphragm supported upon a body of filtering material G, interposed between the two diaphragms.

H indicates a supply-pipe, which may be an ordinary rain-spout, which is projected through the lid I of the filter and serves as a pivot upon which to turn the lid to open the filter. The pipe H also passes through the diaphragm F, the filtering material G, and the diaphragm D, discharging into the compartment E at the bottom of the filter.

J indicates a second pipe, preferably of substantially the same caliber as the pipe H. Its upper end is flared or widened, as at K, so that when passed through an opening in the perforated diaphragm F it will be suspended therefrom, as illustrated in the drawings. This pipe passes downward through the filtering material, the diaphragm D and bottom B of the filter projecting beyond the bottom and discharging its contents wherever desired.

In the operation of the filter the water running down through the pipe H accumulates in the lower compartment E until backed up a sufficient distance in the pipe H to form a column which will give pressure enough to force the water upward through the filtering material G and diaphragm F into the upper part of the filter, from whence it will pass through the sponge L lodged in the flared mouth of the pipe J and through said pipe into any receptacle placed to receive it, the amount of water filtered and the rapidity of the operation depending largely upon the elevation of the column carried in the pipe H.

From the foregoing description it will be apparent that I have produced a simple, cheap, durable, and effective filter for carrying out the objects of my invention, and while I have illustrated and described the best means now known to me for this purpose I do not wish to be understood as restricting myself to the exact details of construction shown, but hold that any slight changes or variations such as might suggest themselves to the ordinary mechanic would properly fall within the limit and scope of my invention.

Having thus fully described my invention, what I claim as new, and desire to secure by Letters Patent of the United States, is—

1. The combination with a filter, of a supply-pipe passing through the top thereof into the interior, and a lid for the filter pivotally connected upon the supply-pipe, substantially as described.

2. The combination in a filter, of a fixed, perforated diaphragm near the bottom, a removable, perforated diaphragm near the top, an intermediate body of filtering material, a supply-pipe passing through both diaphragms and the filtering material and discharging in the lower compartment of the filter, and a discharge-pipe passing upward through the bottom of the filter and the two diaphragms, having its upper end flared to rest in an opening in the removable diaphragm, substantially as described.

3. The herein-described filter, comprising the main body, A, with closed bottom, B, and discharge-pipe, C, the fixed diaphragm, D, near the bottom, below which is formed a chamber, E, the body of filtering material resting upon said diaphragm, the upper diaphragm, F, removably placed upon the body of filtering material, the lid, I, the supply-pipe, H, passing through and pivotally supporting the lid, I, extending through the diaphragms and filtering material to the lower compartment of the filter, and the discharge-pipe, J, with flared upper end, supported in the upper diaphragm and extending through the filtering material, the lower diaphragm and the bottom of the filter, substantially as described.

JOHN RAYMOND HASELDEN.

Witnesses:
W. T. MATTINGLY,
S. G. HASELDEN.